(12) United States Patent
Grimald et al.

(10) Patent No.: US 12,170,027 B2
(45) Date of Patent: Dec. 17, 2024

(54) AIRCRAFT MISSION CALCULATION SYSTEM, ABLE TO CALCULATE AN ENVIRONMENTAL BENEFIT INDEX, AND RELATED PROCESS

(71) Applicant: DASSAULT AVIATION, Paris (FR)

(72) Inventors: Cyrille Grimald, Saint-Cloud (FR); Benoît Urien, Saint-Cloud (FR)

(73) Assignee: DASSAULT AVIATION, Paris (FR)

( * ) Notice: Subject to any disclaimer, the term of this patent is extended or adjusted under 35 U.S.C. 154(b) by 234 days.

(21) Appl. No.: 17/967,587

(22) Filed: Oct. 17, 2022

(65) Prior Publication Data

US 2023/0122408 A1 Apr. 20, 2023

(30) Foreign Application Priority Data

Oct. 19, 2021 (FR) ..................................... 21 11077

(51) Int. Cl.
*G01C 21/20* (2006.01)
*G08G 5/00* (2006.01)

(52) U.S. Cl.
CPC ......... *G08G 5/0034* (2013.01); *G08G 5/0021* (2013.01); *G08G 5/006* (2013.01); *G08G 5/0091* (2013.01)

(58) Field of Classification Search
None
See application file for complete search history.

(56) References Cited

U.S. PATENT DOCUMENTS

| | | | |
|---|---|---|---|
| 7,383,104 B2 * | 6/2008 | Ishii | G01C 23/00 701/1 |
| 9,269,205 B1 * | 2/2016 | Lamkin | G07C 5/0825 |
| 10,121,384 B2 * | 11/2018 | Hale | G08G 5/0091 |
| 10,867,521 B2 | 12/2020 | Grimald | |
| 11,042,150 B2 * | 6/2021 | Hansman | B64D 37/005 |
| 11,436,928 B2 * | 9/2022 | Grimald | G08G 5/0034 |

(Continued)

FOREIGN PATENT DOCUMENTS

EP 3489931 A1 5/2019

OTHER PUBLICATIONS

Search Report for priority application FR 21 11077.
(Continued)

*Primary Examiner* — Jonathan M Dager
(74) *Attorney, Agent, or Firm* — Davidson Kappel LLC

(57) ABSTRACT

An aircraft mission calculation system is configured to calculate an environmental benefit index. The system includes an aircraft trajectory calculation engine, able to calculate at least one potential mission trajectory between a geographic point of origin and a geographic point of destination. The aircraft trajectory calculation engine comprises an environmental benefit index calculation module, able to activate the calculation engine. The environmental benefit index calculation module is able to determine an environmental benefit index (GI) of the potential trajectory from the first amount of carbon dioxide (Q1(TR1)) produced on a first reference trajectory defining a fastest mission, the second amount of carbon dioxide produced on a second reference trajectory (Q2(TR2)), defining a mission minimizing the amount of carbon dioxide produced, and the potential amount of carbon dioxide produced on the potential trajectory.

17 Claims, 10 Drawing Sheets

(56) References Cited

U.S. PATENT DOCUMENTS

| | | | | |
|---|---|---|---|---|
| 11,816,996 | B1* | 11/2023 | Smith-Velazquez | ........................ G01C 23/005 |
| 2011/0205044 | A1* | 8/2011 | Enomoto | ............. G07C 5/0841 340/439 |
| 2013/0018583 | A1* | 1/2013 | Miura | ................ G01C 21/3697 434/62 |
| 2013/0027226 | A1* | 1/2013 | Cabos | .................. G08G 5/0082 340/961 |
| 2013/0085672 | A1* | 4/2013 | Stewart | .................. G08G 5/003 701/528 |
| 2014/0088799 | A1* | 3/2014 | Tino | ........................ G06F 30/20 703/2 |
| 2014/0244077 | A1 | 8/2014 | Laso-Leon et al. | |
| 2015/0153177 | A1* | 6/2015 | Bailey | .................. G08G 5/0013 701/400 |
| 2016/0085239 | A1* | 3/2016 | Boyer | .................. G05D 1/0676 701/5 |
| 2016/0093217 | A1* | 3/2016 | Hale | .................... G08G 5/0091 701/120 |
| 2016/0093222 | A1* | 3/2016 | Hale | .................... G08G 5/0021 701/120 |
| 2016/0137184 | A1* | 5/2016 | Hokoi | ............... B60W 50/0097 180/65.265 |
| 2016/0163201 | A1 | 6/2016 | Le Merrer et al. | |
| 2016/0293005 | A1* | 10/2016 | Nomoto | ............ G08G 1/096716 |
| 2017/0249849 | A1* | 8/2017 | De Prins | ............... G08G 5/0013 |
| 2018/0082595 | A1* | 3/2018 | Hamilton | ................ G06Q 50/40 |
| 2019/0164438 | A1* | 5/2019 | Grimald | ............. G01C 21/3469 |
| 2019/0164440 | A1* | 5/2019 | Briand | .................... G01C 23/00 |
| 2019/0295425 | A1* | 9/2019 | Grimald | ................ G08G 5/0034 |
| 2020/0020237 | A1* | 1/2020 | Grimald | ................. G08G 5/006 |
| 2020/0302805 | A1* | 9/2020 | Grimald | ................. G05D 1/042 |
| 2022/0238025 | A1* | 7/2022 | McCann | ................ G08G 5/0039 |
| 2023/0015284 | A1* | 1/2023 | Khoury | ................ G06Q 30/018 |
| 2023/0123233 | A1* | 4/2023 | Urien | ................... G08G 5/0034 701/415 |
| 2023/0161043 | A1* | 5/2023 | Mayster | ................ G01S 17/931 356/5.01 |
| 2023/0326354 | A1* | 10/2023 | Durant | .................... G01W 1/02 701/3 |

OTHER PUBLICATIONS

Ramasamy Subramanian et al: "Novel Flight Management System for Improved Safety and Sustainability in the CNS+A Context", 2015 Integrated Communication, Navigation and Surveillance Conference (ICNS), Apr. 21, 2015, p. G3-8.

* cited by examiner

AIRCRAFT MISSION CALCULATION SYSTEM, ABLE TO CALCULATE AN ENVIRONMENTAL BENEFIT INDEX, AND RELATED PROCESS

The present disclosure relates to an aircraft mission calculation system including:
  a calculation engine to calculate trajectories of the aircraft during the mission, the trajectory calculation engine being able to calculate at least one potential mission trajectory between a geographic point of origin and a geographic point of destination as a function of aircraft performance, mission operational specifications, and a meteorological context preferably evolving in a mission volume between the geographic point of origin and the geographic point of destination.

The present disclosure applies to aircraft used in civil aviation, in particular in business aviation.

Such a calculation system is intended to be integrated in a cockpit, in parallel with a flight management system (FMS), to enable the crew to determine mission trajectories.

Alternatively, the calculation system is able to be integrated into a non-embarked mission planning system, for example in an aircraft trajectory setting airport infrastructure, in an electronic flight bag (EFB), and/or in a portable electronic device (for example, a tablet), or in a PC or ground server type computer.

The calculation system is able to determine a complete trajectory of the aircraft between a first geographic point of origin and a second geographic point of destination. The mission comprises one or more steps.

BACKGROUND

Preparing and defining an aircraft mission between a first geographic point and a second geographic point is a time consuming task. In particular, it requires determining the route that the aircraft will follow, the associated flight profile, the loading of passengers, cargo and fuel and the calculation of low speed performance, as well as the verification of the flight envelope of the aircraft.

This definition is performed as a function of a mission context including meteorology, flight air routes to take, connectivity with satellite communication systems and an aircraft context that includes the configuration and type of aircraft used, as well as its operational status.

Typically, in civil aviation, airlines and/or external suppliers have calculators system to provide a flight plan and expected aircraft performance, such as the amount of fuel required.

In business aviation, the constraints on the crew are important and specific. Customers sometimes require the crew to meet more stringent mission criteria, for example in terms of passenger comfort during the flight, the ability to connect to satellite transmission systems, the weight offered by the aircraft, etc.

In addition, mission conditions, including take-off times, are subject to change and the destination can change rapidly depending on the specific needs of the passengers.

In this context, the existing flight plan delivery systems are not fully satisfactory.

In particular, these systems are designed to work on a sum of input criteria (speed, flight level, number of passengers . . . ) to which a single navigation solution will correspond. It is therefore frequently necessary to perform several iterations to adjust the mission assumptions.

Moreover, the results obtained by flight plan provider systems are generally incomplete with respect to the criteria required to perform the mission, especially in the management of customer criteria, aircraft context and performance.

As a result, the trajectory solutions proposed by the provider are not satisfactory for the customer and/or result in a non-optimal flight time and/or increased fuel consumption.

To improve such systems, U.S. Pub. No. 2020/0302805A1 describes a mission calculation system of the aforementioned type, wherein a user can select mission operational specifications, and determine at least one optimal mission trajectory, which takes into account the user-defined operational specifications, by offering different options to the user.

Such a calculation system can still be improved. Indeed, the environmental constraints of reducing greenhouse gas emissions apply to civil aviation, in particular to business aviation.

Aircraft manufacturers aim to reduce aircraft emissions by improving aircraft design, for example by modifying their aerodynamics and/or making them lighter. However, the environmental impact of an optimized trajectory compared to a base trajectory provided by an external supplier, or in absolute terms, is not easily controlled or quantified by an aircraft user.

SUMMARY

An object of the present disclosure is therefore to provide an aircraft mission calculation system, which allows the crew to easily define an optimized trajectory, taking into account environmental constraints.

To this end, the present disclosure has as its subject matter a mission calculation system of the aforementioned type, characterized by an environmental benefit index calculation module, able to activate the trajectory calculation engine to determine a first reference trajectory from first mission operational specifications defining a fastest mission between the geographic point of origin and the geographic point of destination, and to determine a second reference trajectory from second mission operational specifications defining a mission minimizing the amount of carbon dioxide produced during the mission,
  the environmental benefit index calculator being able to calculate a first amount of carbon dioxide that may be produced by implementing the first reference trajectory, a second amount of carbon dioxide that may be produced by implementing the second reference trajectory, and a potential amount of carbon dioxide that may be produced by implementing the potential trajectory, and determining an environmental benefit index of the potential trajectory from the first amount of carbon dioxide, the second amount of carbon dioxide, and the potential amount of carbon dioxide, as well as a correlation function relating the amount of carbon dioxide produced to the environmental benefit index,
  the mission calculation system further including a display system, and a display manager on the display system, able to display on the display system, after the calculation of the potential trajectory by the trajectory calculation engine, at least one environmental benefit indicator obtained from the environmental benefit index.

The system according to the present disclosure may comprise one or more of the following features, taken alone or in any technically possible combination:

the environmental benefit indicator includes a numerical quantity equal to the environmental benefit index or calculated from the environmental benefit index and/or a color representative of the numerical quantity;

the maximum value of the environmental benefit index corresponds to the value of the environmental benefit index calculated for the second reference trajectory, the minimum value of the environmental benefit index corresponds to the value of the environmental benefit index calculated for the first reference trajectory, the minimum value of the environmental benefit index presenting a non-zero value;

the correlation function is a decreasing function defined by the environmental benefit index calculation module from the maximum value of the environmental benefit index associated to the second quantity of carbon dioxide, the minimum value of the environmental benefit index related to the first quantity of carbon dioxide produced, the decreasing function preferably being an affine function;

the first reference trajectory is calculated from operational specifications comprising a maximum possible Mach of the aircraft, the calculation of the second reference trajectory being carried out using a Mach reduced by at least 5% relative to the maximum possible Mach used for the first reference trajectory, advantageously by using a free flight trajectory, without being constrained by a network of waypoints and imposed trajectories between the waypoints;

the environmental benefit index calculation module is able to activate the trajectory calculation engine to determine a plurality of potential trajectories, using different predefined operational specifications, the environmental impact index calculation module being able to calculate each potential environmental benefit index corresponding to each potential trajectory, the display management system being able to display a window for simultaneous presentation of the environmental benefit indicators corresponding to each environmental benefit index calculated for each potential trajectory;

the operational specifications of the potential trajectories are chosen among a minimization of the amount of fuel carried by the aircraft, a reduced Mach of the aircraft, an exact calculation of the weight and balance of the aircraft by a weight and balance application, a vertical trajectory optimization, a route optimization involving a free flight trajectory, and/or a route optimization involving a free flight trajectory followed by a trajectory optimization around the free flight trajectory to respect imposed waypoints, and imposed trajectories between the imposed waypoints;

the display manager on the display system is able to display on the display system a window for defining operational specifications of the mission, allowing a user to define at least one operational specification of a potential trajectory of the aircraft, the environmental benefit index calculation module being able to calculate an environmental benefit index corresponding to the potential trajectory calculated from the operational specification defined by the user in the definition window;

the display manager on the display system is able to display on the display system a map including the geographic point of origin, the geographic point of destination, and a base trajectory between the geographic point of origin and the geographic point of destination, the definition window being able to allow the user to select a zone to avoid and/or a base trajectory zone to be optimized, the trajectory calculation engine being able to recalculate a potential trajectory modifying the base trajectory after selection of the zone to avoid and/or the zone to be optimized, the environmental benefit index calculation module being able to calculate an environmental benefit index corresponding to the potential trajectory modifying the basic trajectory;

the display manager on the display system is able to display on the map the environmental benefit indicator determined from the environmental benefit index corresponding to the potential trajectory modifying the base trajectory, associated to the potential trajectory modifying the base trajectory;

the definition window is able to allow the user to define at least one operational specification chosen from among a determined Mach, a change of Mach at reduced speed, an optimization of the flight levels, a free flight trajectory, a trajectory imposed by a network of waypoints and/or imposed trajectories between the waypoints, the trajectory calculation engine being able to calculate the potential trajectory modifying the base trajectory as a function of the selected operational specification;

the definition window is able to allow the user to define a zone to be avoided and/or a zone to be optimized manually on the map.

The present disclosure also has as its subject matter a method for calculating an aircraft mission, implemented using a mission calculation system, the method comprising the following steps:

calculation by a trajectory calculation engine of the mission calculation system at least one potential mission trajectory between a geographic point of origin and a geographic point of destination as a function of aircraft performance, mission operational specifications, and a preferably evolving meteorological context in a mission volume between the geographic point of origin and the geographic point of destination activating the trajectory calculation engine by an environmental benefit index calculation module of the mission calculation system to determine a first reference trajectory from first mission operational specifications defining a fastest mission between the geographic point of origin and the geographic point of destination, and to determine a second reference trajectory from second mission operational specifications defining a mission minimizing the quantity of carbon dioxide produced during the mission calculating by the environmental benefit index calculation module a first amount of carbon dioxide that may be produced by implementing the first reference trajectory, a second amount of carbon dioxide that may be produced by implementing the second reference trajectory, and a potential amount of carbon dioxide that may be produced by implementing the potential trajectory determining an environmental benefit index of the potential trajectory from the first quantity, the second quantity, and the potential quantity, and a correlation function relating the amount of carbon dioxide produced to the environmental benefit index, displaying by a display manager of the mission calculation system on a display system of the mission calculation system, after the calculation of the potential trajectory by the trajectory calculation engine, at least one environmental benefit indicator obtained from the environmental benefit index.

The method according to the present disclosure may comprise one or more of the following features, taken alone or in any technically possible combinations:

the method includes the calculation of a plurality of potential trajectories by the trajectory calculation engine as a function of predefined operational specifications, the calculation, by the environmental benefit index calculation module, of an environmental benefit index corresponding to each potential trajectory, and the display, on the display system, by the display manager, of an environmental benefit indicator corresponding to each potential trajectory;

the method includes the displaying by the display manager on the display system a definition window of mission operational specifications, then the defining by a user of at least one operational specification of a potential trajectory of the aircraft, and the calculating by the environmental benefit index calculation module of an environmental benefit index value corresponding to the potential trajectory defined from the operational specification, defined by the user in the definition window.

BRIEF DESCRIPTION OF THE DRAWINGS

The present disclosure will be better understood upon reading the following description, given only as an example, and made with reference to the appended drawings, on which.

DETAILED DESCRIPTION

Figure 1:
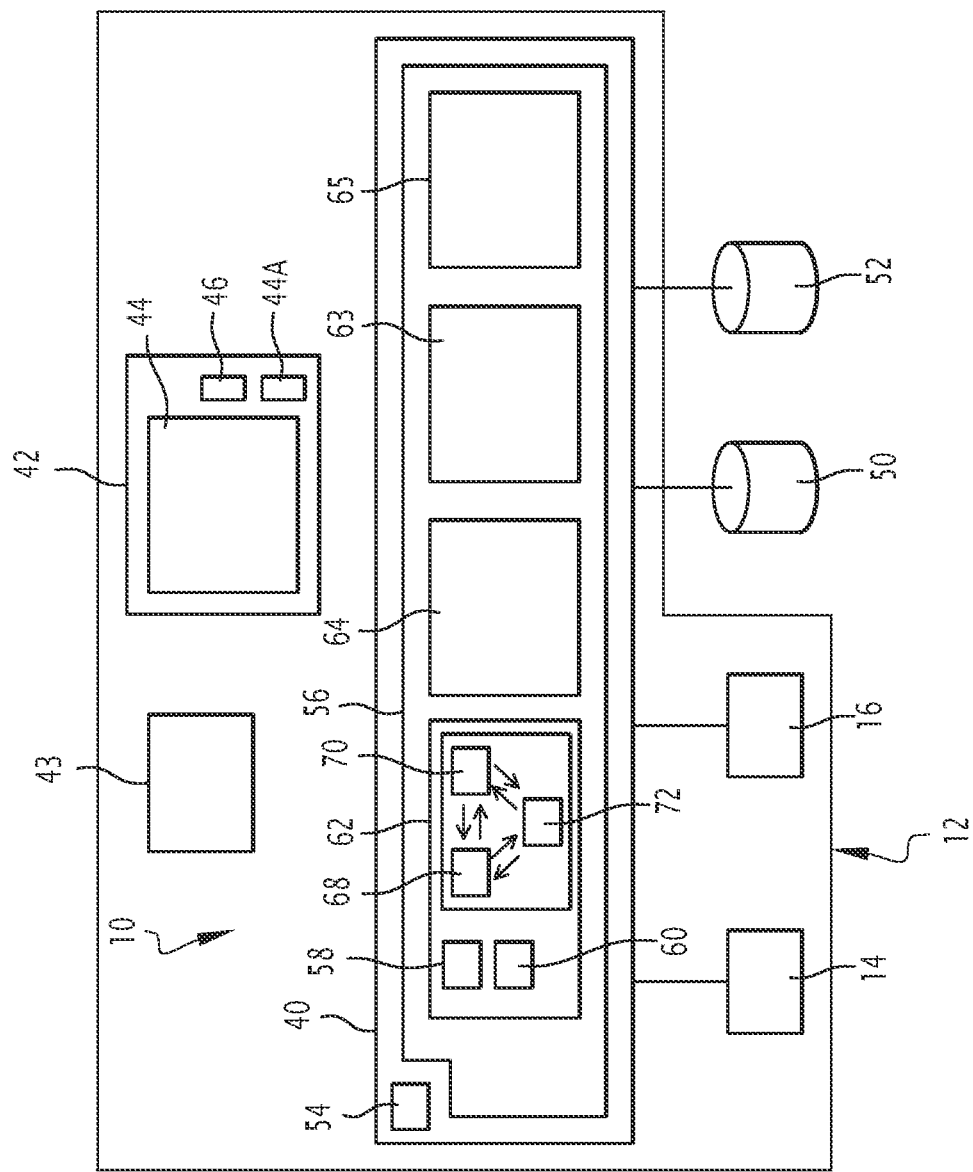
FIG. 1 is a block diagram illustrating a first mission calculation system according to the present disclosure.

A first mission calculation system 10 according to the present disclosure, which in this example is present in the cockpit 12 of an aircraft, is illustrated in FIG. 1.

The aircraft is preferably a civil aircraft, in particular a business aircraft.

In a known manner, the cockpit 12 of the aircraft is intended to control all the systems of the aircraft during its use.

The cockpit 12 includes, in addition to the mission calculation system 10, a flight management system 14 for the aircraft cockpit, and a system 16 for managing and monitoring the various aircraft systems.

The flight management system 14 is intended to assist the pilot of the aircraft in navigating the aircraft during a mission. It is able to provide information in particular on the route followed by the aircraft, and on the changing parameters of the aircraft such as the fuel consumption.

Figure 5:
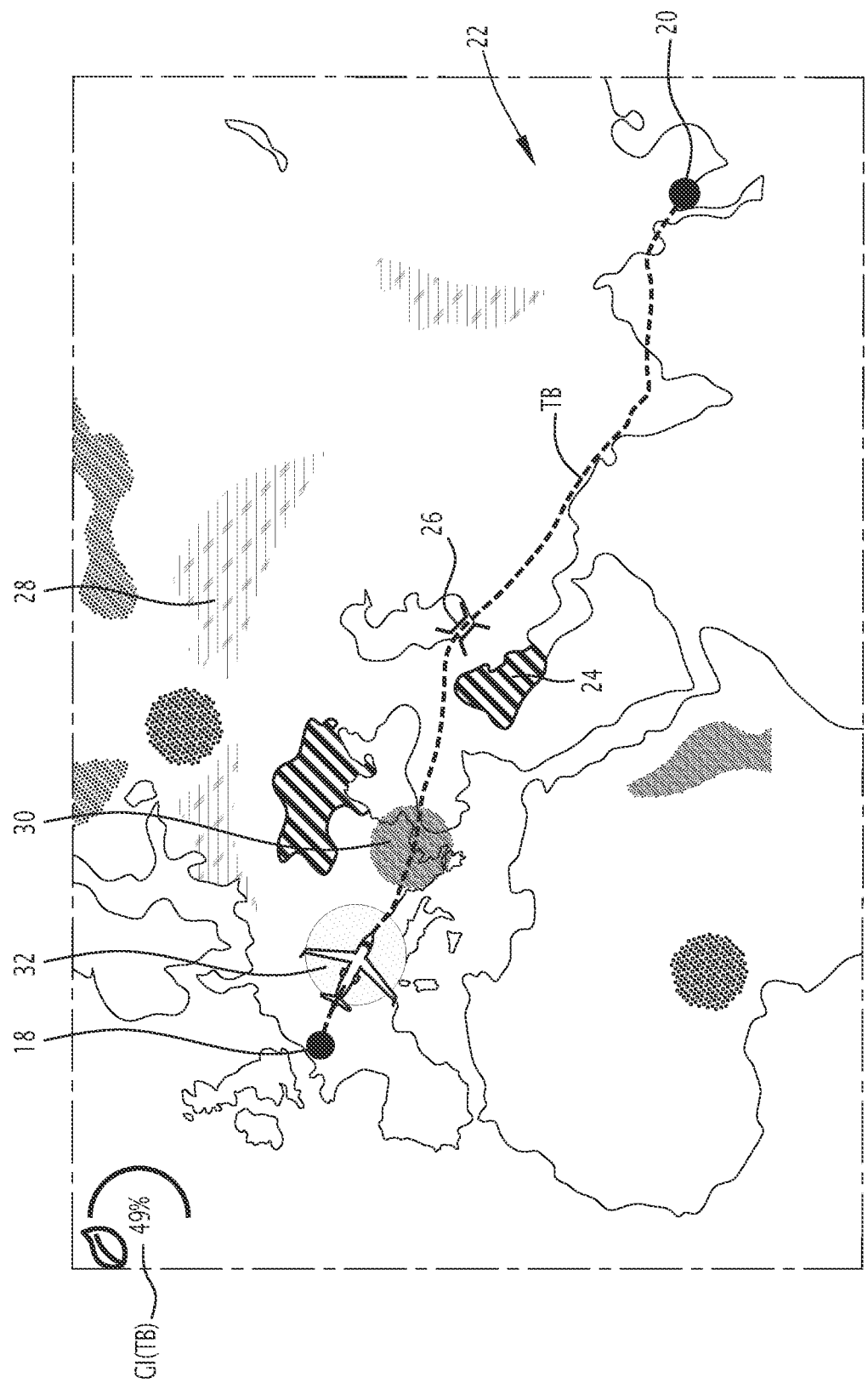
FIG. 5 is a schematic view of a display of a base trajectory on a display system of the calculation system according to the present disclosure.

It is also able to guide the aircraft to follow a predetermined trajectory between a first geographic point of origin 18 and a second geographic point of destination 20 (shown schematically in FIG. 5).

The system 16 for managing and monitoring the various aircraft systems is intended, in particular, to allow the crew to monitor and possibly to pilot all the aircraft systems. In particular, it is able to determine an operating state of the aircraft, in particular the presence of faults and failures present on the aircraft on the ground and/or in flight. As will be seen below, the mission calculation system 10 according to the present disclosure is connected to the management system 16 to take into account the state of the aircraft in the mission calculations.

The mission performed by the aircraft includes at least one leg 22, shown schematically in FIG. 5, between a first geographic point of origin 18 and a second geographic point of destination 20. In some cases (not shown), the mission performed by the aircraft includes a plurality of successive legs 22, with the second geographic point of destination 20 of a first leg constituting the first geographic point of origin 18 of a second leg.

The mission is performed according to operational specifications comprising, in particular, a mission context, an aircraft context, a passenger context and possibly a trajectory optimization mode.

The mission context includes, for example, at least one operational constraint, such as a number of passengers to be carried, a maximum take-off weight linked, in particular, to the length of the available runway, a navigation fuel load, a reserve fuel load, an imposed departure and/or arrival time, a maximum distance to be covered, and/or a distance to an alternative terrain en route.

With reference to FIG. 5, the mission context advantageously comprises navigational constraints, such as, for example, prohibited zones 24 or flight levels, airways 26 or imposed flight levels, or more generally free flight zones and/or flight zones imposed by airways.

The mission context advantageously comprises meteorological constraints such as dangerous meteorological phenomena zones 28, such as ice formation or cumulonimbus formation.

The mission context may also comprise passenger comfort constraints, in particular zones of turbulence 30 to be avoided, in particular as a function of a desired level of turbulence, chosen for example from among a low level, a medium level, and a high level of turbulence, or zones of satellite telecommunication coverage 32 to allow telecommunication between the aircraft and the outside world, notably on the ground, in particular chosen from among a low level, a medium level, and a high level of communication possibility.

In this example, the different zones 24, 28, 30, 32 are preferably defined by horizontal coordinates (for example, latitude and longitude) and by vertical coordinates in altitude. The position of these zones advantageously evolves over time. In this case, the above-mentioned coordinates evolve temporally, defining a four-dimensional (or 4D) zone of avoidance or, on the contrary, a four-dimensional zone of desired or constrained passage.

The zones 24, 28, 30, 32 therefore define horizontal sections of avoidance or, on the contrary, horizontal sections of desired or constrained passage. Furthermore, they define, in the vertical plane, vertical sections of avoidance or, on the contrary, vertical sections of desired or constrained passage. The position of the zones 24, 28, 30, 32 advantageously evolves over time.

The aircraft context can comprise usage constraints related to dispatch authorizations and/or constraints related to a particular state of the aircraft in terms of faults and/or failures on one or more aircraft equipment.

For example, a departure clearance related to certain aircraft faults may impose a maximum flight level and/or maximum speed. A landing gear or flap retraction fault may also impose an increased fuel consumption constraint.

The trajectory optimization mode includes for example a minimization of the quantity of fuel carried by the aircraft, a reduced Mach of the aircraft, an exact calculation of the weight and balance of the aircraft, a vertical trajectory optimization authorizing the flight at several flight levels, and/or a route optimization involving a trajectory in free flight or constrained by the airways, this can be optimized by sections and therefore have different optimization criteria on the same flight according to the crossed zones. Obtaining the free flight trajectory is possibly followed by a trajectory optimization around the free flight trajectory in order to respect the imposed waypoints, and the imposed trajectories between the imposed waypoints.

The mission calculation system 10 is intended to establish at least one potential trajectory of the aircraft to perform the step 22 between at least a first geographic point of origin 18 and at least a second geographic point of destination 20, taking into account operational specifications, in particular the mission context, aircraft context, and optimization mode.

Preferably, as will be seen below, the mission calculation system 10 is intended to establish, prior to the mission, a plurality of potential trajectories of the aircraft according to different operational specifications, to allow the user to have several trajectory opportunities.

Furthermore, prior to the mission or during the mission, the mission calculation system 10 is intended to establish, upon selection by the user, at least one potential trajectory from a base trajectory by modifying the operational specifications over at least one optimization zone and/or avoidance zone.

According to the present disclosure, the mission calculation system 10 is able to determine, for the or each potential trajectory, an environmental benefit index associated to the potential trajectory.

The trajectory obtained by means of the mission calculation system 10 includes the route of the aircraft in latitude and longitude, with possibly a vertical flight profile, defined by one or more altitudes and passage times.

Advantageously, the mission calculation system 10 is also able to establish flight plan parameters, in particular the weight and balance of the aircraft, the take-off and landing card (that is, the flight data for the pilot relating to guidance such as speeds V1, V2, VR on the runway, the acceleration at brake release, engine speed at take-off, and/or attitude at take-off), calculation of take-off and landing weight limits, low speed (that is, ground) and high speed (that is, en route) meteorology, air traffic control information (ATIS "Automated|Terminal Information System", e-NOTAM for "Notice to airmen", telecommunication frequencies, FIRS for "Flight Information System", etc.), telecommunication frequency, FIRS for "Flight Information RegionS", air traffic control center), and/or the alternative airfields available at destination, and on the way.

With reference to FIG. 1, the mission calculation system 10 includes a trajectory calculation engine 40 and, advantageously, a user interface 42 for parameterization and restitution forming a mission dashboard. It includes a module 43 for calculating the environmental benefit index associated to each trajectory established by the calculation engine 40.

The user interface 42 includes, for example, at least one display system 44, associated to a display manager 44A on the display system 44 and at least one device 46 for selecting and entering information by the user, which may be a real or virtual keyboard, a mouse and/or a touch system.

The user interface 42 is able to allow the user to enter at least part of the operational specifications, in particular the geographic point of origin 18 and geographic point of destination 20, the waypoints, the desired times, the desired loads, a maximum wind on the trajectory, etc.

It is advantageously able to allow the user to define at least part of the mission context, in particular the navigation and passenger comfort constraints, and/or of defining at least part of the aircraft context.

Figure 4:
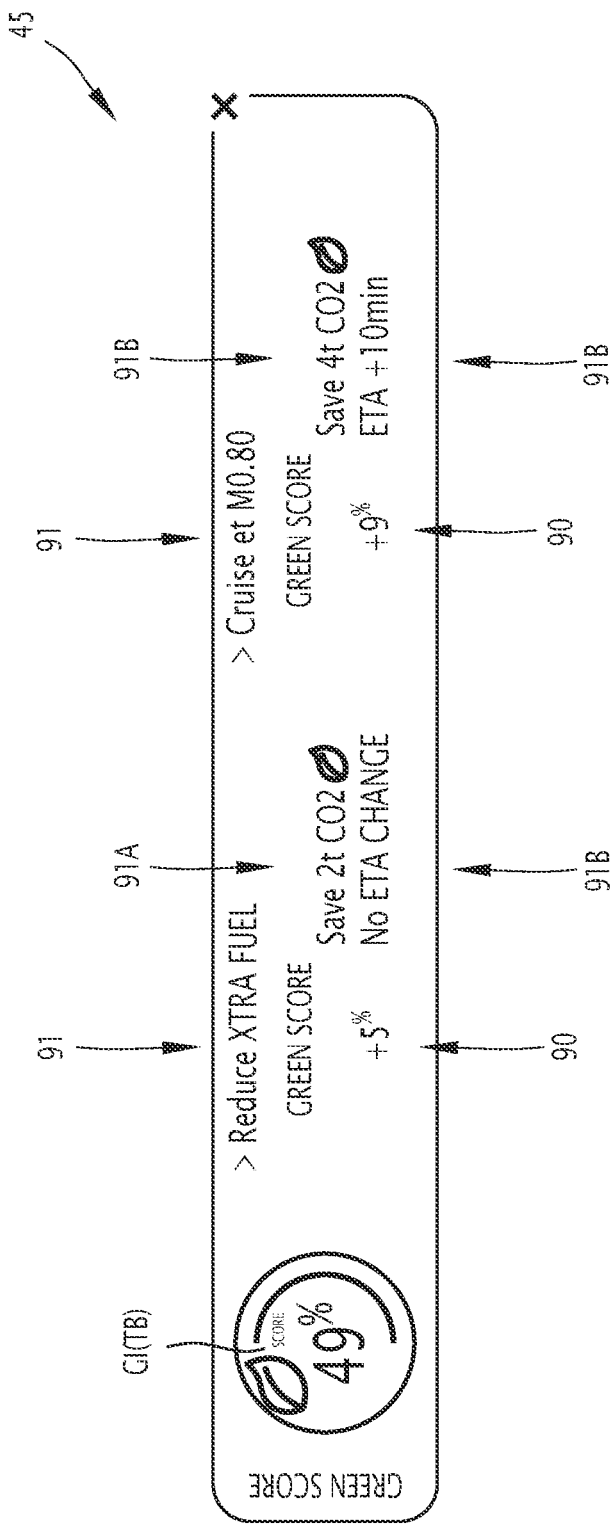
FIG. 4 is a view of a window presenting an environmental benefit indicator of several potential trajectories, with reference to a base reference trajectory, as presented to the user.

As will be seen below, the user interface 42 is also able to display at least one window 45 for presenting environmental benefit indicators as a function of the trajectories established according to predefined operational specifications (see FIG. 4), and if necessary, a window 47 for the user to select a trajectory optimization mode, when the user wishes to determine the environmental benefit of a particular trajectory option.

An example of an interface 42 is described in U.S. Pub. No. 2019/0164440A1, which is hereby incorporated by reference herein.

The calculation engine 40 is connected to the interface 42. It is advantageously also connected to the flight control system 14 and to the management and tracking system 16.

It is able to query a meteorological database 50 and/or a navigation information database 52, for example by means of a data network, in particular a wireless data network.

The meteorological database 50 contains current and predictive meteorological data in the navigation area of the aircraft in a mission volume extending between the point of origin 18 and the point of destination 20. The mission volume preferably has a significant width, for example at least 700 nautical miles, on either side of the orthodromic trajectory between the point of origin 18 and the point of destination 20.

This meteorological data is provided at multiple flight levels, for example every 304 m (1000 feet), at an altitude of, for example, between 0 m and 15545 m (51000 feet).

The meteorological data is provided in altitude but also by providing a meteorological component evolving in time. This evolving component is obtained using meteorological forecast data, which may include a plurality of meteorological maps at successive instants in time (for example, every hour).

In particular, these meteorological data include wind speed and direction, temperature, pressure, rainfall, dangerous phenomena (ice, thunderstorms/cumulonimbus), turbulence, tropopause level, volcanic ash clouds, dust/sand clouds, visibility, as well as aeronautical observations in the zone or on the way (METAR, PIREPS) and forecasts in the zone (TAF) . . . . They may include the definition and evolution in time and space of the geographic coordinates of dangerous meteorological phenomena zones 28 and/or turbulence zones 30.

These meteorological data define a meteorological context, preferably evolving, in the mission volume extending between the geographic point of origin 18 and the geographic point of destination 20.

The navigation information database 52 contains terrain information data at and between the point of origin 18 and the point of destination 20. Advantageously, the navigation information database 52 includes an airport sub-database (runway lengths, runway orientation, slopes, etc.) and a navigation sub-database. The navigation data includes in particular a network of waypoints 53A and the trajectories 53B imposed between the waypoints, as defined by the aviation authorities in each country (see FIG. 9).

It advantageously contains the definition of the geographic coordinates of prohibited zones and/or flight levels 24, in particular because of geopolitical data, and/or imposed airways 26.

It may also include the definition of satellite communication coverage zones 32 (SATCOM).

The calculation engine 40 includes at least one calculator comprising at least one processor 54 and a memory 56. The memory 56 contains software modules able to be executed by the processor 54. Alternatively, the modules are realized at least partially in the form of programmable logic components, or even in the form of dedicated integrated circuits.

In this example, the memory 56 contains a software module 58 for initializing mission specifications, able to acquire operational specifications of the mission in particular from the interface 42, and including a software module 60 for retrieving a meteorological context from the database 50, and a software module 62 for determining aircraft performance, as a function of the mission specifications, the meteorological context and the aircraft context.

According to the present disclosure, the memory 56 also contains at least one software module 64, 65 for calculating a trajectory as a function of the determined aircraft performances, the meteorological context and the mission specifications.

Figure 9:
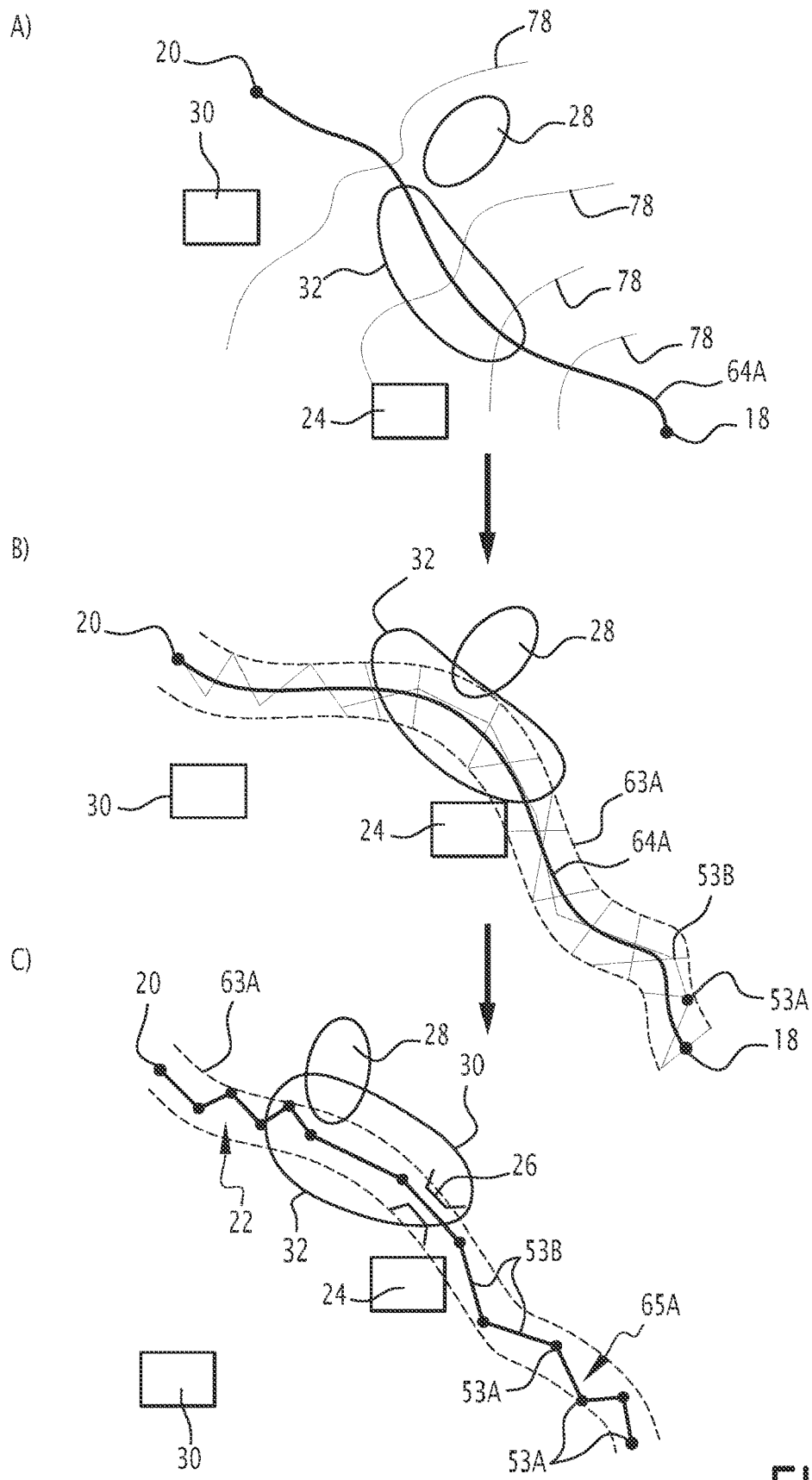
FIG. 9 is a schematic view illustrating the operating principle of an example of a trajectory calculation engine that can be used in the calculation system according to the present disclosure.

In an advantageous example, illustrated by FIG. 1, relative to FIG. 9, the memory 56 contains a first software module 64 for calculating a first optimal mission trajectory 64A, as a function of the determined aircraft performance, the meteorological context and the mission specifications, the first calculation module 64 being able to calculate the first optimal mission trajectory 64A in a manner not constrained by a network of waypoints 53A and/or imposed trajectories 53B between the waypoints 53A.

Advantageously, as described for the system in U.S. Pub. No. 2020/0020237A1, which is hereby incorporated by reference herein, the memory 56 also contains a module 63 for defining, around the first optimal mission trajectory 64A, a region to be optimized 63A of the optimal trajectory 64A and a second module 65 for calculating an optimized trajectory 65A of the aircraft in the region to be optimized 63A, in a manner constrained by a network of waypoints 53A and/or imposed trajectories 53B between the waypoints 53A.

The initialization module 58 is able to acquire the operational specifications of the mission from the interface 42, and/or from the control and tracking system 16.

The retrieval module 60 is able to interrogate the meteorological database 50 to obtain, in particular, the wind speeds and directions in the mission volume extending between the point of origin 18 and the point of destination 20, at several flight levels.

The determination module 62 includes an aircraft weight and balance determination software application 66 intended for determining the center of gravity of the aircraft, a high speed performance determination software application 68, and advantageously a low speed performance determination software application 70.

The weight and balance determination application 66 of the aircraft is able to determine the position of the center of gravity of the aircraft in the absence of fuel in the aircraft (or "Zero Fuel Weight Center of Gravity") and the weight of the aircraft in the absence of fuel in the aircraft (or "Zero Fuel Weight"), as a function of the empty weight of the aircraft, the equipment on board the aircraft, the passengers and/or the freight on board, and their position in the aircraft, as well as monitoring the aircraft flight domain (weight-balance diagram).

The high speed performance determination application 68 is able to determine the weight of fuel to be loaded in the aircraft on a given trajectory, for example an orthodromic trajectory between the point of origin 18 and the point of destination 20, using the position of the center of gravity and the weight of the aircraft in the absence of fuel in the aircraft (or "Zero Fuel Weight") determined by the application 66, a predetermined airspeed, for example entered or calculated from the data entered by the user interface 42, the meteorological context retrieved from the module 60, in particular wind speed and temperature and possibly the aircraft context, for example the type and age of the engines, retrieved from the initialization module 58.

The high-speed performance determination application 68 also includes functions for calculating instantaneous fuel consumption and variation of the instantaneous aircraft weight during a trajectory, advantageously using the position of the center of gravity and the aircraft weight in the absence of fuel in the aircraft, a predetermined airspeed, for example entered or calculated from the data entered by the user interface 42, the meteorological context retrieved from the module 60, in particular wind speeds and temperatures and possibly the aircraft context, for example the type and age of the engines, retrieved from the initialization module 58.

The high-speed performance determination application 68 also includes a function for determining achievable flight levels as a function of the predetermined air speed, the meteorological context, and possibly the aircraft context.

These functions for calculating instantaneous consumption, variation in instantaneous aircraft weight and determination of attainable flight levels are able to be called up by the calculator module 64 for calculating iso-displacement curves as will be seen below.

The low-speed performance determination application 70 is able to determine, in particular, the maximum aircraft weight (and takeoff checklist) allowing the aircraft to take off and/or land on a terrain, as a function of runway length data retrieved from the database 52, and the meteorological context retrieved from the module 60.

In an advantageous example, the first calculation module 64 is as described in U.S. Pub. No. 2020/0302805A1, which is hereby incorporated by reference herein.

It is configured to calculate, from at least one selected point accessible to the aircraft, a plurality of iso-displacement curves 78, in particular isochronous curves, fuel iso-consumption curves, or iso-cost curves, and optionally extended iso-displacement curves, at one or more flight stages.

The first calculation module 64 is configured to choose an optimal trajectory 64A based on the calculated iso-displacement curves 78.

With reference to FIG. 9, the first calculation module 64 is able to determine each point of the optimal trajectory 64A in a manner unconstrained by a network of waypoints 53A and/or imposed trajectories 53B between the waypoints 53A.

Thus, the determination of the optimal trajectory 64A by the first calculation module 64 is implemented as if the aircraft were able to perform a free flight taking into account the mission specifications, but without taking into account the network of waypoints 53A and/or trajectories 53B imposed between the waypoints 53A that are defined by the air traffic control authorities.

The first calculation module 64 is thus able to define an optimal trajectory 64A not only in the horizontal plane, but advantageously also in the vertical plane.

By definition, an isochronous curve is a curve connecting the points accessible to the aircraft from a given point (which may be the point of origin 18 or a point on an isochronous curve) in a given time which corresponds to one or more time increments. Each time increment is, for example, comprises between 1 minute and 1 hour, particularly between 2 minutes and 10 minutes, for example 5 minutes.

By definition, a fuel iso-consumption curve is a curve connecting the points accessible to the aircraft from a given point with a given fuel consumption that corresponds to one or more increments of fuel consumed. Each increment of time consumed is chosen at a constant value for example between 22.7 kg (50 pounds) and 453.6 kg (1000 pounds), particularly between 36.3 kg (80 pounds) and 54.4 kg (120 pounds).

In one example, the iso-displacement curves are iso-cost curves, where cost is defined as a function of travel time and fuel consumed, for example as a ratio of travel time and fuel consumed.

Each displacement increment is a cost increment of a constant given value.

In this example, each iso-displacement curve is determined from a given point by calculating from the given point all points accessible to the aircraft, at a given airspeed, taking into account the meteorological context, particularly wind direction and intensity, as provided by the recovery module 60, and aircraft performance, as determined by the calculation functions of the application 68.

With reference to FIG. 9, the definition module 63, when present, is advantageously able to define the region to be optimized 63A of the trajectory as a function of a predetermined lateral distance to each point of the optimal trajectory 64A defined by the first calculation module 64 and as a function of the mission operational specifications, in particular the mission context, navigation constraints, meteorological constraints, and passenger comfort constraints.

Advantageously, the definition module 63 is able to laterally delimit the region to be optimized 63A of the trajectory 64A by lateral limits extending laterally at a distance chosen as a function of the density of the air network of each point of the optimal trajectory 64A.

This chosen distance is generally less than 1852 km (1000 nautical miles or "nm") and may be between 185 km (100 nm) and 926 km (500 nm) in a low density network, for example in Africa, and between 183 km (99 nm) and 55 km (30 nm) in a high density network such as in Europe.

Thus, the region to be optimized 63A is generally defined by a band encompassing the trajectory 64A. The band is potentially also constrained by no-fly zones 24, by dangerous meteorological phenomena zones 28 and/or by turbulence zones 30. It includes, according to the case, areas of satellite coverage 32.

The second calculation module 65 of the trajectories 65A, when present, comprises an application for defining a network of nodes between the geographic point of origin 18 and the geographic point of destination 20 from the network of waypoints 53A and/or trajectories 53B imposed between the waypoints 53A, and an application for defining a cost associated to the passage from one node to an adjacent node among the nodes of the network.

The second calculation module 65 also includes an application for determining the optimized trajectory 65A through the network of nodes based on minimizing the total cumulative cost between the geographic point of origin 18 and the geographic point of destination 20.

The algorithm is, for example, a Dijkstra algorithm and/or an A* algorithm. The Dijkstra algorithm takes as input the weighted network defined above between the geographic point of origin 18 and the geographic point of destination 20.

A description of the use of the Dijkstra algorithm is given in U.S. Pub. No. 2020/0020237A1.

A description of the A* algorithm is, for example, given in the article downloadable at the following address: https://fr.wikipedia.org/wiki/Algorithme_A*.

Once the optimized trajectory 65A is obtained, the calculation engine 40 is advantageously able to determine at least one mission parameter of the aircraft corresponding to the optimal trajectory 64A or the optimized trajectory 65A, as the case may be.

The mission parameter is, for example, a total take-off weight of the aircraft. This take-off weight is calculated at each iteration by the calculation module 64 and then by the calculation module 65, based on the estimated consumption on the trajectory between the point of origin 18 and the point of destination 20, calculated using the functions for calculating the instantaneous fuel consumption and the variation of the instantaneous aircraft weight, and based on the passenger and freight load predefined in the operational specifications.

The calculation engine 40 is then able to carry out calculation iterations using successively the modules 64, 65, until obtain a final optimized trajectory 65A after convergence.

Once convergence is obtained, the calculation engine 40 is able to establish an estimated mass of fuel consumed by the aircraft between the geographic point of origin 18 and the geographic point of destination 20 on the final trajectory obtained from the operational specifications specific to this trajectory, as well as an estimated time of arrival (ETA) at the point of destination 20.

Once the final optimized trajectory is obtained, the calculation engine 40 provides a trajectory data file defining the geographic coordinates of the trajectory as a function of time.

This data file is able to be retrieved by the crew and/or to be loaded by manual input or by data transfer into the flight control system 14, in view to be use during the flight.

According to the present disclosure, the environmental benefit index calculation module 43 is able to calculate, for the or each potential trajectory T obtained by the calculation module 40, an environmental benefit index GI(T), specific to this trajectory.

It includes at least one calculator comprising at least one processor and a memory, which are possibly common with the processor 54 and the memory 56 of the calculation engine 40. The memory contains software modules able to be executed by the processor. Alternatively, the modules are realized at least partially in the form of programmable logic components, or in the form of dedicated integrated circuits.

The calculation module 43 is advantageously able to calculate the environmental benefit index of each potential trajectory established by the calculation engine 40, from at least two predefined reference trajectories TR1, TR2, and a correlation function established from the reference trajectories.

To this end, the calculator module 43 is able to activate the mission calculation engine 40 to define a first reference trajectory TR1 corresponding to a predefined mission minimizing the flight time between the point of origin 18 and the point of destination 20, and a second reference trajectory TR2 corresponding to a mission having a minimum environmental impact, in particular a minimum production of carbon dioxide.

The calculation module 43 is able to initialize the calculation engine 40, to determine the mission which presents the shortest flight time between the point of origin 18 and the point of destination 20, using the highest maximum acceptable speed for the aircraft, using the aircraft context and the meteorological context of the mission and the fastest trajectory in projection in the horizontal plane and in the vertical plane.

The maximum acceptable speed is for example defined by a maximum acceptable (flyable) Mach, for a given aircraft model, for example greater than 0.85 and for example equal to 0.86.

Advantageously, the first trajectory calculation module 64 and the second trajectory calculation engine 65 are able to be activated to minimize the flight time between the first geographic point of origin 18 and the geographic point of destination 20 with a flight trajectory constrained by a network of waypoints and imposed trajectories between the waypoints, the waypoints and the imposed trajectories being defined by the air traffic control authorities.

The calculation engine 40 is therefore able to obtain, for the first reference trajectory TR1, a first quantity of fuel C1(TR1) consumed by the aircraft between the geographic point of origin 18 and the geographic point of destination 20, as well as a first estimated time of arrival (ETA1) at the point of destination 20.

The trajectory obtained will be both the fastest and the least virtuous in terms of carbon dioxide emissions.

Conversely, for the establishment of the second reference trajectory TR2, an optimal mission profile is chosen by using a profile adapted to cruise at maximum speed, obtained by the modules 64, 65 and a minimum Mach, lower than 0.82, in particular equal to 0.80 is chosen.

Advantageously, the first trajectory calculation module 60 is able to be activated to calculate the second reference trajectory TR2 between the first geographic point of origin 18 and the geographic point of destination 20 with a free flight trajectory, without activating the second calculation module 65. No flight time constraint is set.

The calculation engine 40 is therefore able to obtain, for the second reference trajectory TR2, a second quantity of fuel C2(TR2) consumed by the aircraft between the geographic point of origin 18 and the geographic point of destination 20, as well as a second estimated time of arrival (ETA2) at the destination point 20.

The calculator module 43 is thus able to calculate the quantities Q1(TR1), Q2(TR2) of carbon dioxide likely to be produced by implementing the first reference trajectory TR1 and by implementing the second reference trajectory TR2 respectively.

These quantities Q1(TR1), Q2(TR2) are calculated respectively from the first quantity of fuel consumed C1(TR1) on the first reference trajectory TR1 and the second quantity of fuel consumed C2(TR2) on the second reference trajectory TR2, obtained by the calculation engine 40, then by converting the quantity of fuel consumed into a quantity of carbon dioxide produced, for example by a coefficient of proportionality, for example equal to 3.163 since one ton of fuel consumed generally produces 3.163 tons of carbon dioxide.

The calculation module 43 is then able to determine the parameters of the correlation function F, from the quantities Q1(TR1), Q2(TR2) of carbon dioxide produced by implementing the first reference trajectory TR1, and by implementing the second reference trajectory TR2.

To this end, the calculation module 43 is able to assign to the first quantity of carbon dioxide Q1(TR1) corresponding to the first reference trajectory TR1, a minimum value GIR1 of environmental benefit index. This GIR1 value is preferably non-zero and is for example equal to 50%.

The calculation module 43 is able to assign to the second quantity of carbon dioxide Q2(TR2) corresponding to the second reference trajectory TR2, a maximum value GIR2 of environmental benefit index, for example equal to 100%.

The correlation function F thus links a quantity of carbon dioxide Q(T) produced on a potential trajectory T, to an environmental benefit index GI(T).

Figure 2:
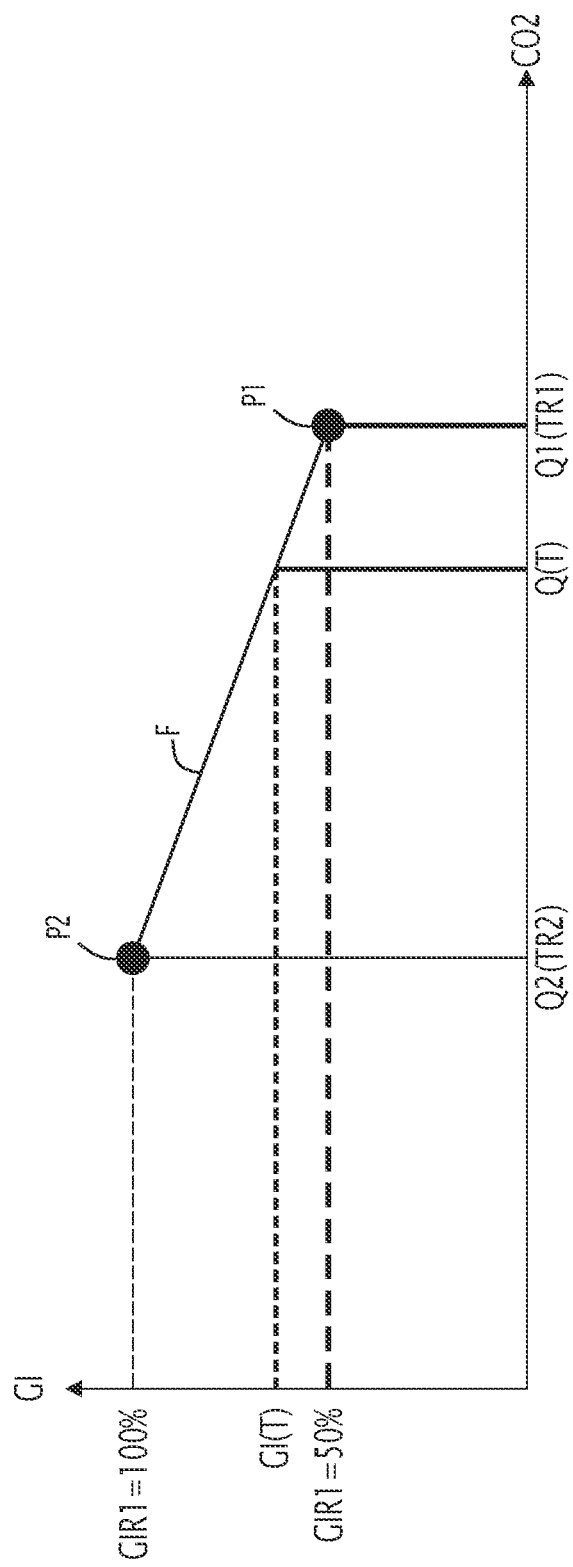
FIG. 2 is a view of a function for defining an environmental benefit index defined by the mission calculation system according to the present disclosure, for a potential trajectory of the aircraft.
Figure 3:
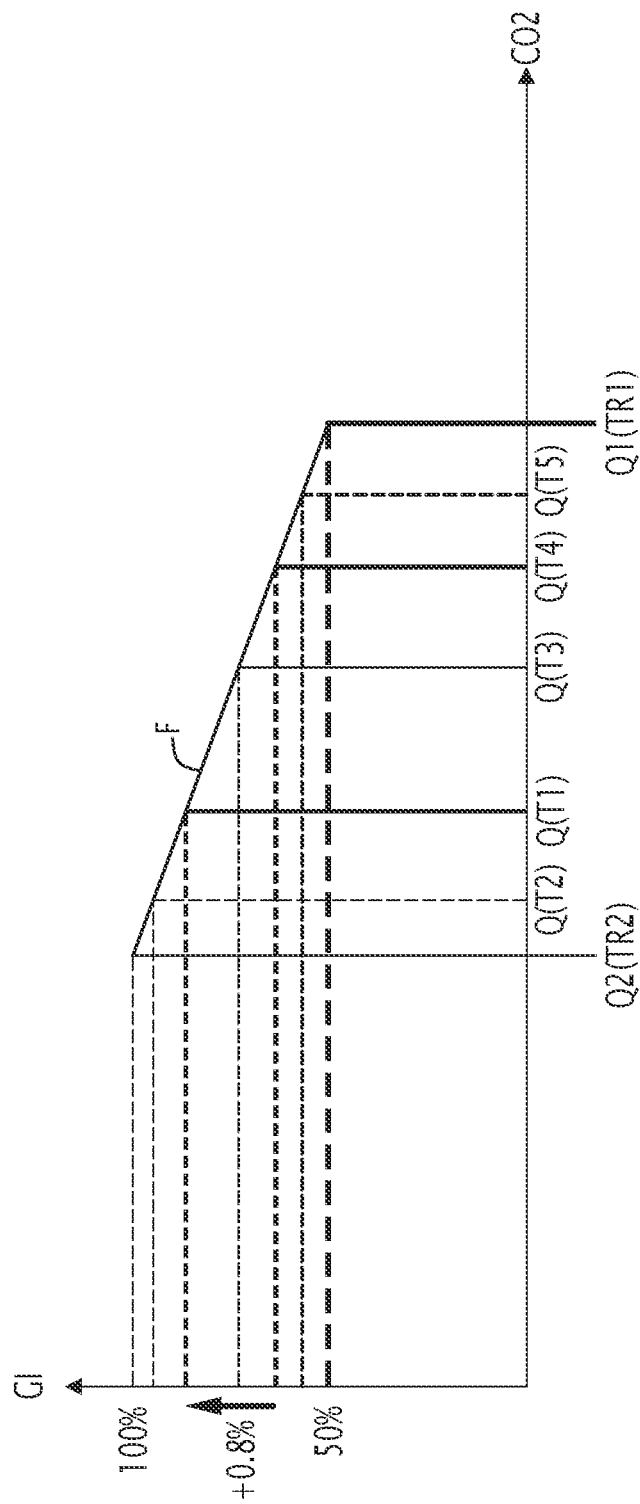
FIG. 3 is a view similar to FIG. 2 illustrating the calculation, by the mission calculation system, of an environmental benefit index on several trajectories proposed to the user, prior to a mission.

In the example shown in FIG. 2, the correlation function F is an affine function, between the first point P1 defined by the quantity Q1(TR1) of carbon dioxide produced, corresponding to the first reference trajectory TR1 and the minimum value GIR1 of the environmental benefit index and the second point P2 defined by the quantity Q2(TR2) of carbon dioxide produced, corresponding to the second reference trajectory, and the maximum value GIR2 of the environmental benefit index. Alternatively, the function presents a profile that passes under the affine function in the vicinity of the maximum quantities Q1(TR1) of carbon dioxide produced, corresponding to the first reference trajectory TR1. This allows to penalize more the environmental benefit index GI(T) for trajectories producing a significant amount of carbon dioxide.

Thus, for any potential trajectory T evaluated, the calculation module 43 is able to calculate an environmental benefit index GI(T) of this trajectory from the correlation function F and the quantity Q(T) of carbon dioxide produced on this potential trajectory T, such as determined by the calculation engine 40.

In a first embodiment, the calculation module 43 is able to determine a plurality of environmental benefit indices corresponding to various trajectory opportunities, predefined on the basis of the different operational specifications, in particular different optimization modes.

This determination is carried out preferably after the supply of a base trajectory TB by an external supplier or by the calculation engine 40 before the implementation of the mission.

The predefined trajectories are, for example, a trajectory T1 minimizing the amount of fuel carried in the aircraft, a trajectory T2 allowing a maximum reduction in aircraft speed, a trajectory T3 involving a precise calculation of the weight and balance of the aircraft for example using the determination software application 66, a trajectory T4 in which the vertical movement of the aircraft is free, and a trajectory T5 in which the aircraft route is optimized. An optimized trajectory is obtained with the help of the first calculation engine 60, taking into account the wind in the trajectory calculation and that the trajectory is advantageously determined in free flight. The optimization is performed at least in projection in a horizontal plane.

The environmental benefit index GI(Ti) for each trajectory Ti is calculated from the quantity Q(Ti) of carbon dioxide likely to be generated by the implementation of each trajectory Ti among the base trajectory TB and each predefined trajectory.

The calculation module 43 is then able to determine a difference D(Ti) in environmental benefit index GI(Ti) between each optimized trajectory, and the environmental index GI(TB) of the base trajectory.

This allows a user to determine the benefit of using an optimized trajectory on the environmental impact, relative to the base trajectory TB.

In this first embodiment, the display manager 44A is able to display on the display system 44 the window 45A illustrating an environmental benefit indicator 90 which in this example is the value of the difference in environmental benefit index between the base trajectory TB and the optimized trajectory.

This display is associated to an indication 91 of the type of optimization envisaged (here "Reduce XTRA Fuel" for "Reduce the extra fuel", for the trajectory T1 minimizing the amount of fuel carried in the aircraft and "Cruise at M0.80" for "Cruise at Mach 0.8", for the trajectory T2 allowing a maximum reduction in the speed of the aircraft) and to a quantity of carbon dioxide saved 91A ("save 2t CO2" for "save 2t of CO2"). In addition, the impact 91B on the estimated time of arrival is also displayed to allow the user to take note of it ("No ETA change" for "No change in theoretical arrival time" or "ETA+10 min" for "theoretical arrival time+10 min").

The display manager 45 is able to display the window 45A for example on a screen of the flight management system 16, as a pop-up window.

In a second embodiment, with reference to FIGS. 5 to 8, the calculation module 43 is able to be activated upon user selection, from a base trajectory TB obtained which can be a base trajectory provided by a supplier, or a base trajectory provided by an optimization according to the first embodiment.

Figure 6:
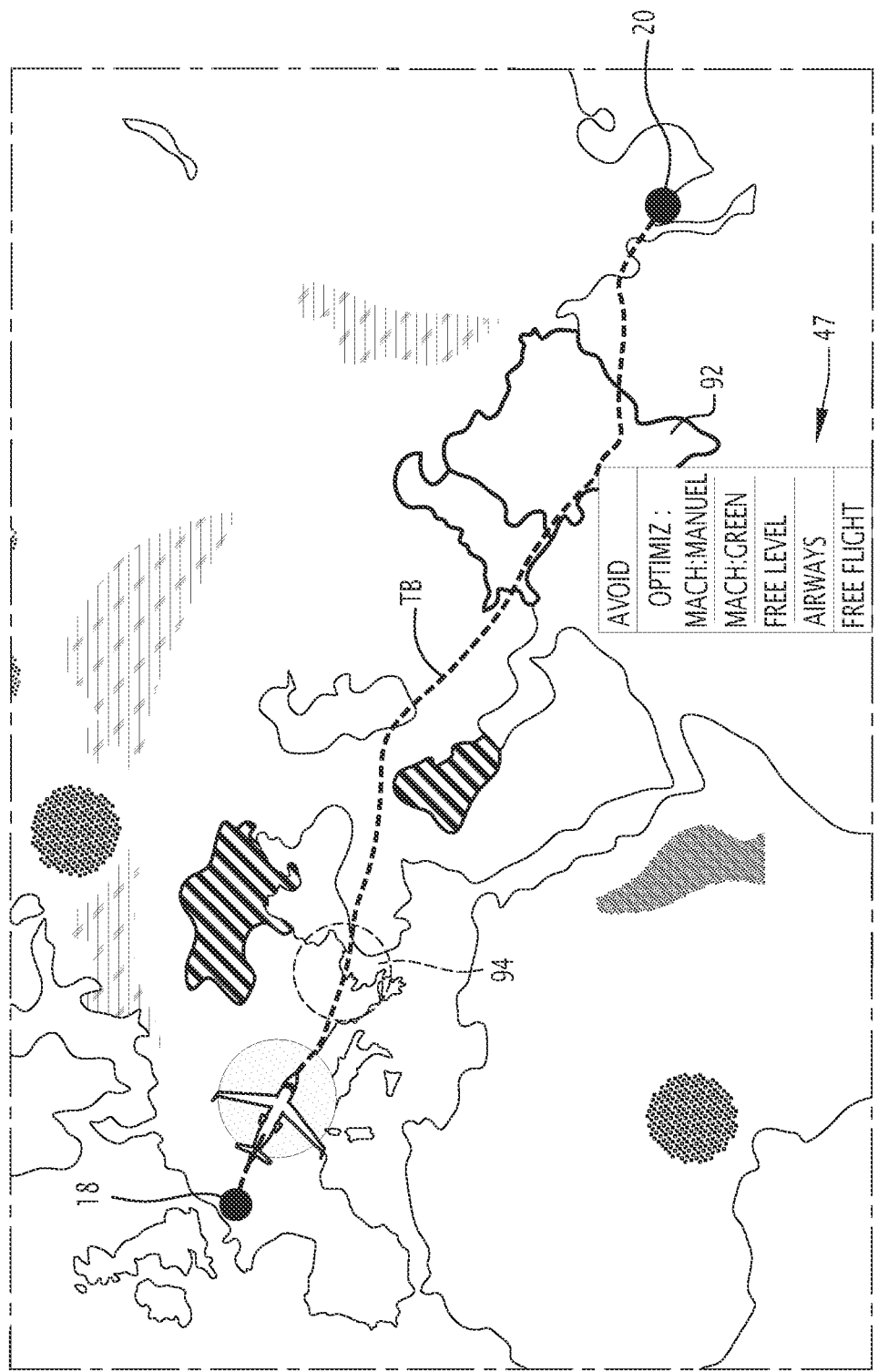
FIG. 6 is a view similar to FIG. 5 illustrating a window for selecting trajectory optimization strategies in a zone to be optimized that can be selected by the user.
Figure 7:
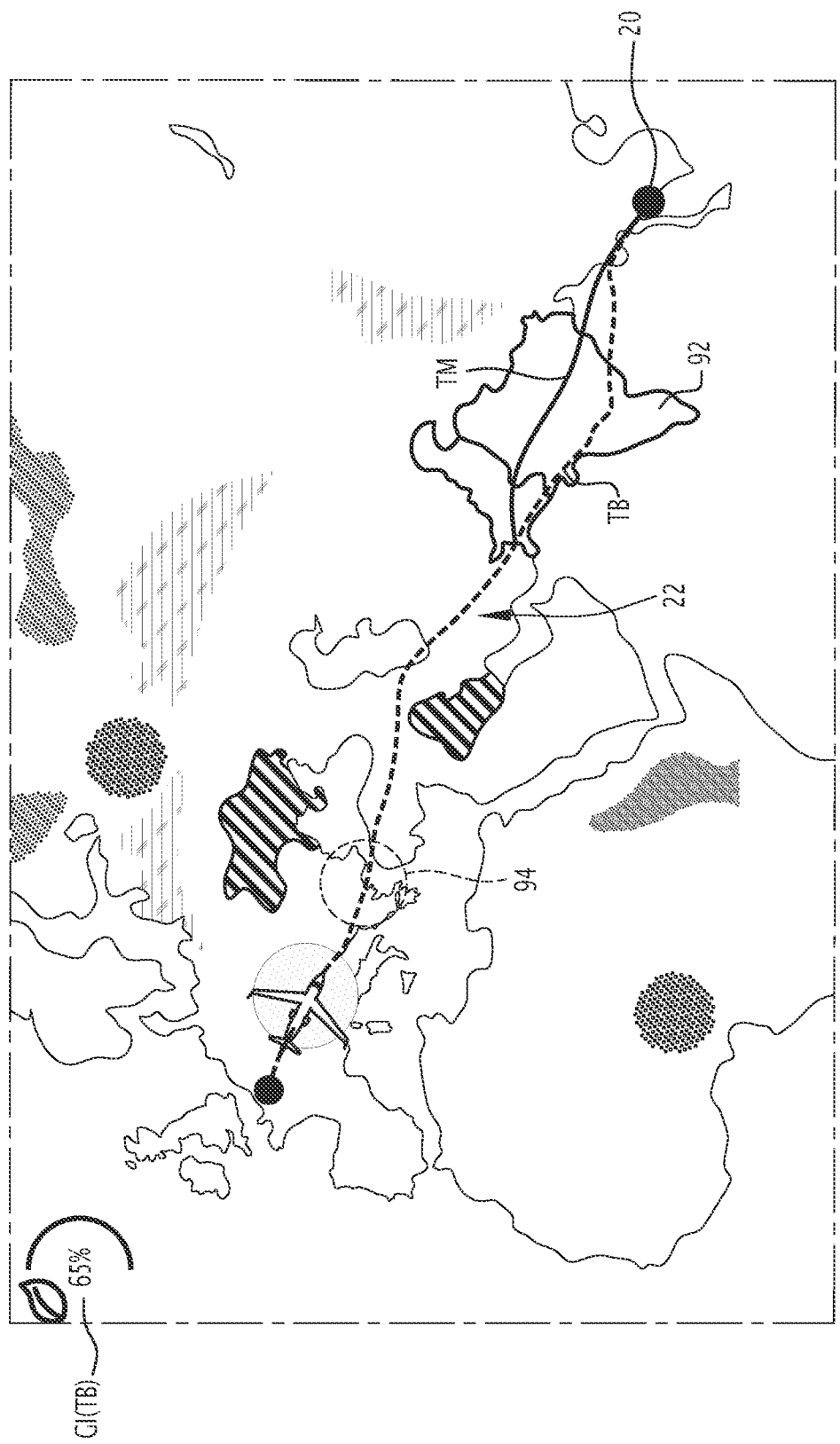
FIG. 7 is a view similar to FIG. 6, after optimization of the zone to be optimized.

In this embodiment, with reference to FIG. 6, the user is able to activate the interface 42, to select, on a map showing the base trajectory TRB, at least one zone to be optimized 92, and/or at least one zone to be avoided 94.

The selection is for example made by manual delimitation of the zone 92, 94 by the user, or by choosing one or more countries or regions constituting the zone 92, 94, using a window or a predefined selection on the display system 44 of the interface 42.

In the case of a zone to be optimized 92, the display manager 45 on the display system 44 is, in addition, able to display, as illustrated in FIG. 6, a window 47 for selecting an optimization mode.

The optimization mode is, for example, a mode of manual choice of a defined Mach ("Manual Mach"), a flight mode with a trajectory allowing a maximum reduction of the aircraft speed ("Mach green"), a flight mode in which the vertical movement of the aircraft is free ("Free level"), a flight mode following existing routes ("Airways") or a free flight mode ("Free flight").

Figure 8:
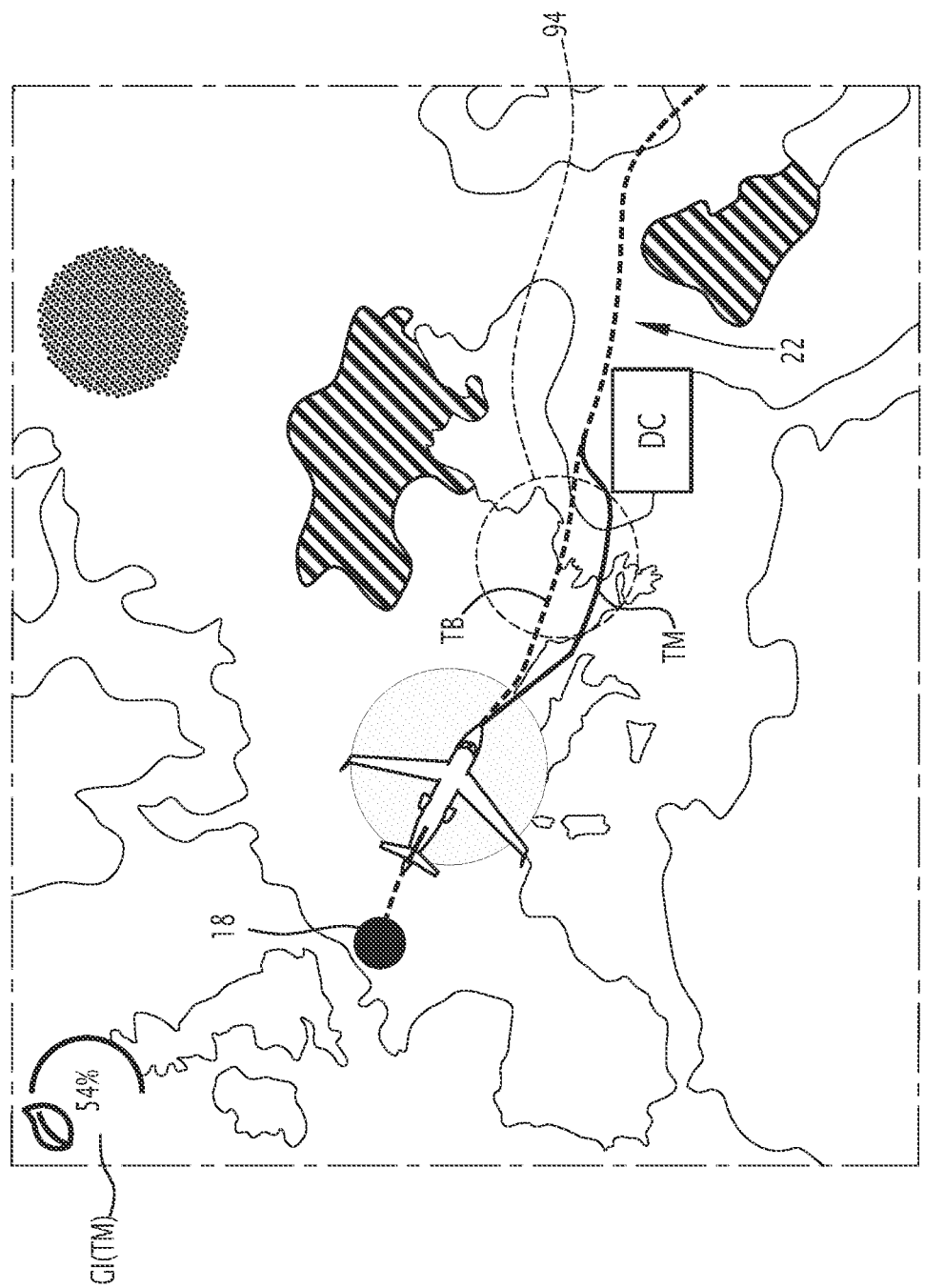
FIG. 8 is a view similar to FIG. 7, after bypassing a zone to be avoided.

Once the user has selected a zone to be optimized 92 or a zone to be avoided 94, and possibly an optimization mode, the calculator module 43 is able to activate the calculation engine 40 to generate a modified trajectory TM in the zone to be optimized 92 (see FIGS. 6 and 7), or to avoid the zone to be avoided (see FIG. 8).

Once the modified trajectory TM has been calculated, the calculation module 43 is able to retrieve the quantity of fuel likely to be used to implement this trajectory TM, as calculated by the calculation engine 40, and then to convert it into a quantity of carbon dioxide produced Q(TM).

The calculation module 43 is then able to determine the environmental benefit index GI(TM) related to the modified trajectory from the quantity of carbon dioxide produced Q(TM) and the correlation function F, as described above.

The calculation module 43 is able to further determine the environmental benefit index GI(TB) of the base trajectory, and for calculating, for example, a difference in environmental benefit index between the base trajectory TB and the optimized trajectory TM.

In the embodiment shown in FIGS. 8 and 9, the display manager 44A is then able to display, before optimization of the trajectory, the value of the environmental benefit index GI(TB) corresponding to the base trajectory TB, and after the selection, by the user of an optimization mode using window 47 and the calculation by the calculation engine 40 of the modified trajectory TM, an environmental benefit indicator which may be the new environmental benefit index GI(TM) corresponding to this modified trajectory and/or a difference in the environmental benefit index between the base trajectory and the optimized trajectory. It is also able to display a difference in fuel consumption DC between the modified trajectory TM and the base trajectory TB.

The user is thus able to select zones to be optimized 92 or zones to be avoided 94 in a very simple way, in order to refine the base trajectory TB and obtain a modified trajectory. He can easily determine whether the modifications made are likely to improve the environmental benefit, and to what extent this improvement occurs.

The user is thus able to implement this optimization with selection of the optimization mode before the flight, or directly during the flight, to take into account the evolution of the flight.

A mission calculation method using the mission calculation system 10 according to the present disclosure will now be described.

Initially, the user, in particular the crew, enters at least part of the operational specifications using the parameterization interface 42. The user defines, for example, for each stage of the mission, the geographic point of origin 18, the geographic point of destination 20 and possibly, a number of passengers to be carried, a desired air speed, a departure time and/or an imposed arrival time, a maximum distance to be covered.

He activates then the calculation engine 40 to define a base trajectory TB.

Alternatively, the mission calculation system 10 retrieves a base trajectory TB from a trajectory provider to which the aforementioned operational specifications have been supplied.

The calculation module 43 then activates the calculation engine 40 to determine, from the operational specifications defined above, the first reference trajectory TR1 and the second reference trajectory TR2, and the first amount of fuel C1(TR1) and the second amount of fuel C2(TR2) corresponding to the respective implementation of these trajectories TR1, TR2.

The calculation module 43 then calculates the quantities Q1(TR1), Q2(TR2) of carbon dioxide likely to be produced by respectively implementing the first reference trajectory TR1 and implementing the second reference trajectory TR2, for example by using a proportionality coefficient as described above.

The calculation module 43 then determines the parameters of the correlation function F, for example by considering that this function is an affine function, from the quantities Q1(TR1), Q2(TR2) of carbon dioxide. For this purpose, it assigns to each quantity Q1(TR1), Q2(TR2) a respective value GIR1, GIR2 of environmental benefit index.

Then, in a first embodiment, the calculation module 43 determines a plurality of environmental benefit indices GI(Ti) corresponding to various trajectory opportunities Ti, predefined on the basis of the different operational specifications, in particular different optimization modes.

The calculation module 43 activates the calculation engine 40 to calculate each trajectory Ti, as a function of the operational specifications and in particular the mode to be optimized corresponding to this trajectory Ti, in order to obtain the respective quantities Q(Ti) of carbon dioxide likely to be generated by the implementation of each trajectory Ti and by the base trajectory TB.

Then, the calculation module 43 obtains the environmental benefit index GI(Ti) for each trajectory Ti from the quantity Q(Ti) of carbon dioxide likely to be generated by the implementation of each trajectory Ti among the base trajectory TB and each predefined trajectory Ti by using the correlation function F.

The calculation module 43 then determines a difference D(Ti) between the environmental benefit index GI(Ti) of each potential trajectory and the environmental index GI(TB) of the base trajectory.

In this first embodiment, the display manager 44A displays on the display system 44 the window 45 illustrating an environmental benefit indicator 90. In this example, the indicator 90 is the value of the difference D(Ti) in environmental benefit index between the potential trajectory Ti and the base trajectory TB.

This display is related to a visualization of the type of optimization being considered 91 and an amount of carbon dioxide saved 91A. In addition, the impact 91B on the estimated time of arrival is also displayed, to allow the user to take note of it.

In a second embodiment, the calculation module 43 is activated upon selection by the user, from a base trajectory TRB obtained which may be a base trajectory provided by a supplier, or a base trajectory provided by an optimization according to the first embodiment.

In this embodiment, the user activates the interface 42, to select, on a map showing the base trajectory TRB, at least one zone to be optimized 92, and/or at least one zone to be avoided 94.

In the case of a zone to be optimized 92, the display manager 45 on the display system 44 displays, as shown in FIG. 6, a selection window 47 for an optimization mode.

Once the user has selected a zone to be optimized 92 or a zone to be avoided 94, and an optimization mode using the window 47, the calculation module 43 activates the calculation engine 40 to generate a modified trajectory TM in the zone to be optimized 92 (see FIGS. 6 and 7), and/or to avoid the zone to be avoided 94 (see FIG. 8).

Once the modified trajectory has been calculated, the calculation module 43 retrieves the quantity of fuel C(TM) likely to be used to implement this trajectory, as calculated by the calculation engine 40, and then converts it into a quantity of carbon dioxide produced Q(TM).

The calculation module 43 therefore determines the environmental benefit index GI(TM) associated to the trajectory from the quantity of carbon dioxide produced Q(TM) and the correlation function F.

Furthermore, the calculation module 43 determines the environmental benefit index GI(TB) of the base trajectory, and calculates, for example, a difference in environmental benefit index between the base trajectory and the optimized trajectory.

In the embodiment shown in FIGS. 8 and 9, the display manager 44A then displays, before the optimization of the trajectory, the value of the environmental benefit index GI(TB) corresponding to the base trajectory, and after the selection by the user of an optimization mode and the calculation by the calculation engine 40 of the modified trajectory TM, the new environmental benefit index GI(TM) corresponding to the modified trajectory TM and/or the difference in environmental benefit index between the modified trajectory and the base trajectory TB.

Thanks to the present disclosure just described, a user can determine, a priori, trajectory opportunities, and can evaluate in an absolute and relative way the environmental benefit that is produced by the trajectory opportunities, relative to a first reference trajectory minimizing the flight time, and relative to a second reference trajectory minimizing the environmental impact.

It is also able to determine, relative to a base trajectory provided by a flight trajectory supplier or resulting from a first optimization, what would be the environmental benefit of the implementation of different modes to optimize the trajectory.

This data is presented to him prior to the flight, which allows him to choose the most efficient way possible, before the flight, the possible and/or desired trajectory optimization mode, by evaluating the environmental benefit that this optimization mode produces.

Furthermore, the user is also able, in a second mode of use, to select a zone to be optimized 92 on a base trajectory TB and/or a zone to be avoided 94 on the base trajectory, and to determine in absolute terms relative to a base trajectory TB, what would be the possible environmental benefit of the trajectory modification performed.

This determination can be made before the flight or during it. The user can then visualize very easily if the modified trajectory is adequate, and to what extent it produces a positive or negative environmental impact relative to the base trajectory TB.

This determination is made by simple and inexpensive means, which are nevertheless representative of the environmental impact of the different options provided to the user.

Figure 10:
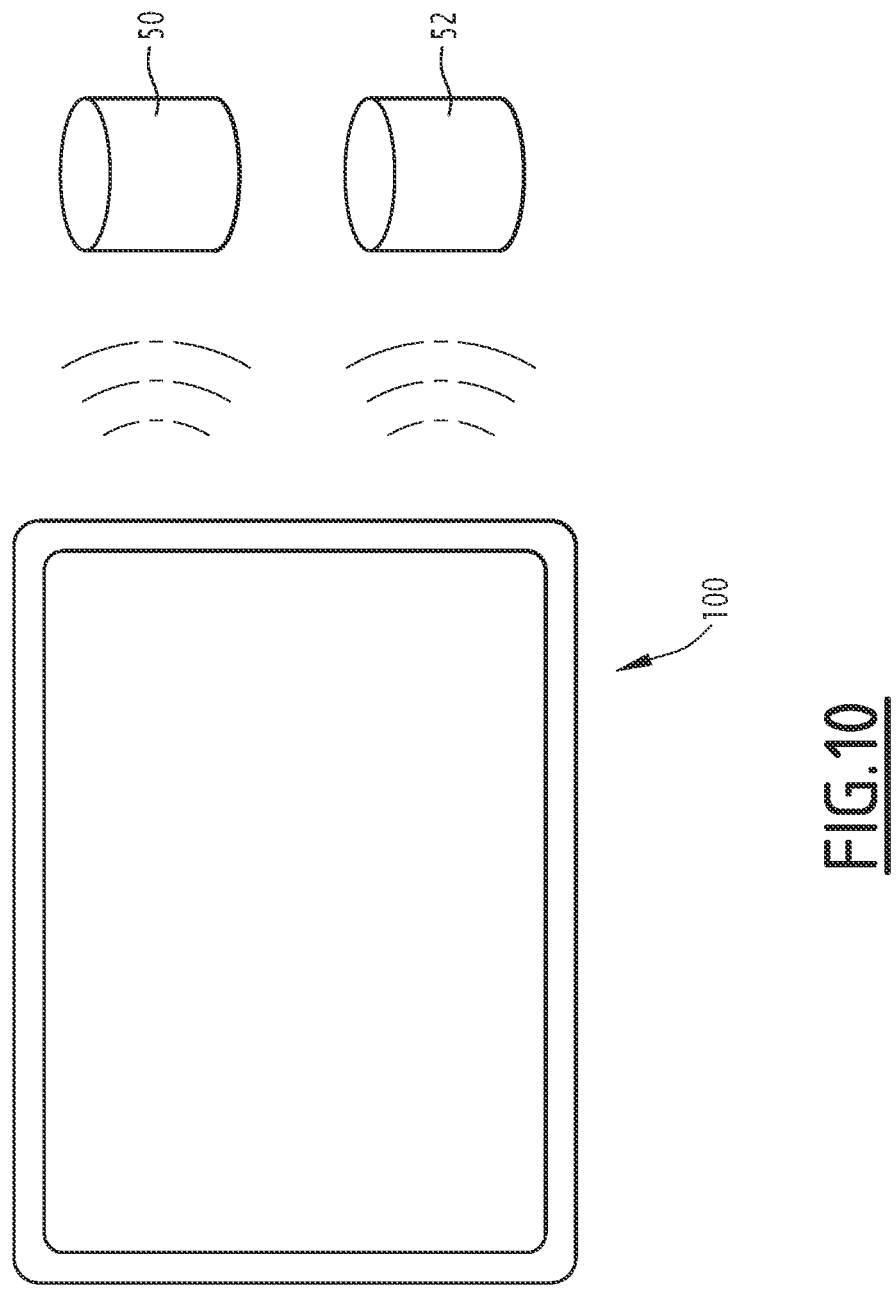
FIG. 10 is a schematic view of a second mission calculation system according to the present disclosure.

In the variant illustrated in FIG. 10, the calculation system 10 is integrated within an electronic flight bag ("EFB"), or a portable electronic device 100.

The portable electronic device 100 is for example connected to the databases 50, 52 by a wireless data link according to a wireless transmission protocol such as WiFi (for example, following the IEEE 802.11 Standard), or Bluetooth (for example, following the IEEE 802.15-1-2005 Standard).

What is claimed is:

1. An aircraft mission calculation system, comprising:
    a trajectory calculation engine configured to calculate trajectories of an aircraft during a mission, the trajectory calculation engine being configured to calculate at least one potential mission trajectory between a geographic point of origin and a geographic point of destination as a function of aircraft performance, mission operational specifications, and as a function of a meteorological context in a mission volume between the geographic point of origin and the geographic point of destination,
    the mission calculation system being configured to activate the trajectory calculation engine to determine a first reference trajectory from first mission operational specifications defining a fastest mission between the geographic point of origin and the geographic point of destination, and to determine a second reference trajectory from second mission operational specifications defining a mission that minimizes an amount of carbon dioxide produced during the mission,
    the mission calculation system being configured to calculate a first amount of carbon dioxide that would be produced by implementing the first reference trajectory, a second amount of carbon dioxide that would be produced by implementing the second reference trajectory, and a potential amount of carbon dioxide that would be produced by implementing the potential mission trajectory and to determine an environmental benefit index of the potential mission trajectory from the first amount of carbon dioxide, the second amount of carbon dioxide, the potential amount of carbon dioxide, and from a correlation function relating the amount of carbon dioxide produced to the environmental benefit index; and
    a display, and a display manager configured to display on the display, after calculation of the potential mission trajectory by the trajectory calculation engine, at least one environmental benefit indicator derived from the environmental benefit index.

2. The mission calculation system according to claim 1, wherein the environmental benefit indicator includes a numerical quantity equal to the environmental benefit index or calculated from the environmental benefit index and/or a color representative of the numerical quantity.

3. The mission calculation system according to claim 1, wherein a maximum value of the environmental benefit index corresponds to a value of the environmental benefit index calculated for the second reference trajectory, a minimum value of the environmental benefit index corresponding to a value of the environmental benefit index calculated for the first reference trajectory, the minimum value of the environmental benefit index having a non-zero value.

4. The mission calculation system according to claim 3, wherein the correlation function is a decreasing function defined from the maximum value of the environmental benefit index associated to the second amount of carbon dioxide, the value of the minimum environmental benefit index associated to the first amount of carbon dioxide produced.

5. The mission calculation system according to claim 4, wherein the decreasing function is an affine function.

6. The mission calculation system according to claim 1, wherein the first reference trajectory is calculated from operational specifications comprising a maximum possible Mach of the aircraft, the calculation of the second reference trajectory being carried out using a Mach reduced by at least 5% from the maximum possible Mach used for the first reference trajectory.

7. The mission calculation system according to claim 6, wherein the calculation of the second reference trajectory is carried out using a free flight trajectory, without being constrained by a network of waypoints and imposed trajectories between the waypoints.

8. The mission calculation system according to claim 1, being configured to activate the trajectory calculation engine to determine a plurality of potential mission trajectories, using different predefined operational specifications, the mission calculation system being configured to calculate each potential environmental benefit index corresponding to each potential mission trajectory, the display manager being configured to display a window configured to simultaneously present the environmental benefit indicators corresponding to each environmental benefit index calculated for each potential mission trajectory.

9. The mission calculation system according to claim 8, wherein the operational specifications of the potential mission trajectories are chosen among a minimization of an amount of fuel carried by the aircraft, a reduced Mach of the aircraft, an accurate calculation of a weight and balance of the aircraft by a weight and balance application, a vertical trajectory optimization, a route optimization involving a free flight trajectory, and/or a route optimization involving a free flight trajectory followed by a trajectory optimization around the free flight trajectory to meet imposed waypoints, and imposed trajectories between the imposed waypoints.

10. The mission calculation system according to claim 1, wherein the display manager is configured to display on the display a mission operational specification definition window configured to allow a user to define at least one operational specification of a potential mission trajectory of the aircraft, the mission calculation system being configured to calculate an environmental benefit index corresponding to the potential mission trajectory calculated from the mission operational specification defined by the user on the mission operational specification definition window.

11. The mission calculation system according to claim 10, wherein the display manager is configured to display on the display a map including the geographic point of origin, the geographic point of destination, and a base trajectory between the geographic point of origin and the geographic point of destination, the mission operational specification definition window being configured to allow the user to select a zone to be avoided and/or a zone to be optimized of the base trajectory, the trajectory calculation engine being configured to recalculate a potential mission trajectory modifying the base trajectory after selection of the zone to be avoided and/or the zone to be optimized, the mission calculation system being configured to calculate an environmental benefit index corresponding to the potential mission trajectory modifying the base trajectory.

12. The mission calculation system according to claim 11, wherein the display manager is configured to display on the map (i) the environmental benefit indicator determined from the environmental benefit index corresponding to the potential mission trajectory modifying the base trajectory, and (ii) the potential mission trajectory modifying the base trajectory.

13. The mission calculation system according to claim 11, wherein the mission operational specification definition window is configured to allow the user to define at least one operational specification chosen from among a determined Mach, an evolution of Mach at reduced speed, an optimization of flight levels, a free flight trajectory, a trajectory imposed by a network of waypoints and/or imposed trajectories between waypoints, the trajectory calculation engine being configured to calculate the potential mission trajectory modifying the base trajectory as a function of the defined operational specification.

14. The mission calculation system according to claim 11, wherein the mission operational specification definition window is configured to allow the user to manually define on the map a zone to be avoided and/or a zone to be optimized.

15. A method for calculating an aircraft mission, implemented using a mission calculation system, the method comprising:
- calculating using a trajectory calculation engine of the mission calculation system at least one potential mission trajectory between a geographic point of origin and a geographic point of destination as a function of aircraft performance, mission operational specifications, and a meteorological context in a mission volume between the geographic point of origin and the geographic point of destination;
- activating the trajectory calculation engine to determine a first reference trajectory from first mission operational specifications defining a fastest mission between the geographic point of origin and the geographic point of destination, and to determine a second reference trajectory from second mission operational specifications defining a mission minimizing an amount of carbon dioxide produced during the mission;
- calculating a first amount of carbon dioxide which would be produced by implementing the first reference trajectory, a second amount of carbon dioxide which would be produced by implementing the second reference trajectory, and a potential amount of carbon dioxide which would be produced by implementing the potential mission trajectory;
- determining an environmental benefit index of the potential mission trajectory from the first amount, the second amount, and the potential amount, as well as from a correlation function relating the amount of carbon dioxide produced to the environmental benefit index; and
- displaying on a display of the mission calculation system, after the calculation of the potential mission trajectory by the trajectory calculation engine, at least one environmental benefit indicator derived from the environmental benefit index.

16. The method according to claim 15, including calculating a plurality of potential mission trajectories by the trajectory calculation engine as a function of predefined operational specifications, and calculating an environmental benefit index corresponding to each potential mission trajectory, and displaying on the display an environmental benefit indicator corresponding to each potential mission trajectory.

17. The method according to claim 16, including displaying on the display a definition window configured to define operational specifications of the mission, then allowing a user to define at least one operational specification of a potential mission trajectory of the aircraft and calculating an environmental benefit index value corresponding to the potential mission trajectory defined from the operational specification by the user on the definition window.

* * * * *